July 13, 1971   S. A. GEWARTOWSKI   3,592,864
HYDROGENATION OF BENZENE TO CYCLOHEXANE
Filed June 27, 1969
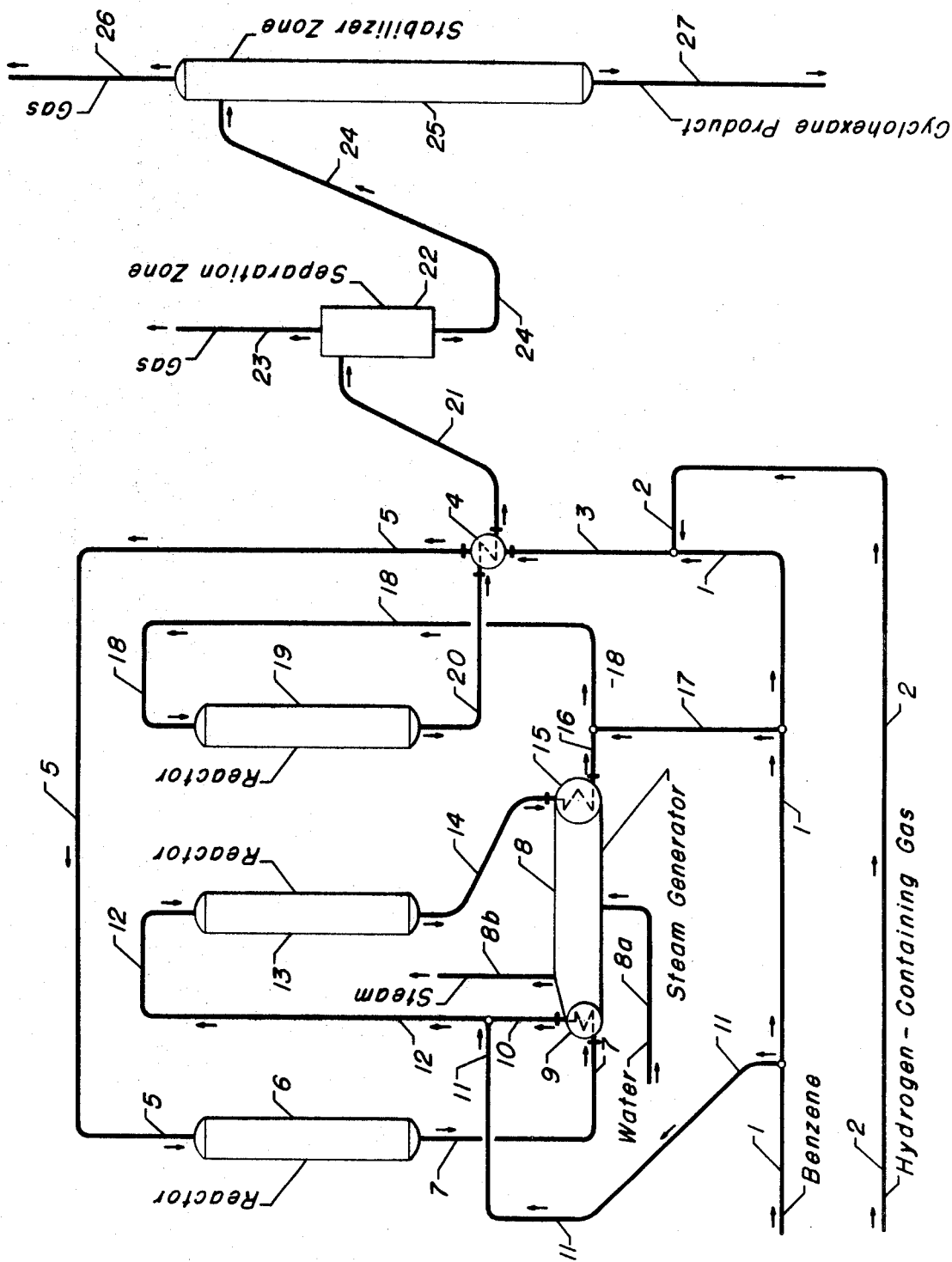
INVENTOR:
Stephen A. Gewartowski
BY: James R. Hoatson, Jr.
Joseph R. Marcus
ATTORNEYS United States Patent Office 3,592,864
Patented July 13, 1971

3,592,864
HYDROGENATION OF BENZENE TO
CYCLOHEXANE
Stephen A. Gewartowski, Mount Prospect, Ill., assignor to
Universal Oil Products Company, Des Plaines, Ill.
Filed June 27, 1969, Ser. No. 837,187
Int. Cl. C07c 5/10
U.S. Cl. 260—667                           12 Claims

ABSTRACT OF THE DISCLOSURE

Process for hydrogenating benzene to form cyclohexane utilizing once-through hydrogen-containing gas wherein the exothermic heat of reaction is utilized as the sole source of heat input to steam generation means and wherein the processing system is enhanced by the elimination of recycle gas compressors, treaters, coolers and heaters.

BACKGROUND OF THE INVENTION

This invention relates to a process for hydrogenating benzene to form cyclohexane. It also relates to a process for producing cyclohexane via the catalytic hydrogenation of benzene in a manner whereby substantial economy of operation is achieved by elimination of various treaters, coolers and a recycle gas system. In addition, the exothermic heat of reaction formed during the catalytic hydrogenation of benzene is completely utilized to provide heat to steam generation means so that a large quantity of refinery steam is available in the typical refinery complex. In addition, flexibility of operation is achieved as compared to prior art processing schemes inasmuch as substantially higher reactor outlet temperatures can be tolerated.

It has long been known that cyclohexane can be prepared by the catalytic hydrogenation of benzene. Cyclohexane is desired by the chemical industry for use in the manufacture of nylon and other industrial products such as cyclohexanol, cyclohexanone, phenol, adipic acid, caprolactam as well as numerous other chemicals.

Generally, the hydrogenation reaction is carried out by contacting benzene and hydrogen in a conventional reaction zone at conditions sufficient to convert the benzene to cyclohexane with a minimum of side reactions. The source for the hydrogen used in the reaction may be obtained from a petroleum hydrocarbon catalytic reforming operation for the production of gasoline boiling range products such as benzene, toluene and xylene. The source for the hydrogen used in the reaction may also be obtained from a petroleum hydrocarbon hydrodealkylation operation utilizing the hydrodealkylation off-gas which often has a hydrogen purity of less than 70% hydrogen.

The prior art processes for the production of cyclohexane have realized that it is extremely important to utilize hydrogen which is relatively free of sulfur-containing compounds. The presence of sulfur has the effect of degrading catalyst stability thereby decreasing the cyclohexane yield and purity. Further, it is known that relatively high molecular weight hydrocarbons such as toluene or other $C_6+$ hydrocarbons have an adverse effect on the quantity and quality of the cyclohexane product. Thus, as is known in the prior art and as used herein, sulfur compounds and $C_6+$ hydrocarbons are removed from the hydrogen-containing steam by means well-known to those skilled in the art and these treating steps form no part of my invention.

In contradistinction to many commercial hydrogenation processing schemes, my invention utilizes once-through hydrogen and, concurrently, utilizes the exothermic heat of reaction created by the hydrogenation reaction. The prior art hydrogenation schemes includes recycle gas facilities such as recycle gas compressors, caustic treaters, knock-out pots, separators, various cooling and heating means as well as disposal means for the spent treating agent.

SUMMARY OF THE INVENTION

Accordingly, it is an object of this invention to provide a process for carrying out the catalytic hydrogenation of benzene to form cyclohexane in a more facile and economical manner.

It is a further object of this invention to provide for the total use of the exothermic heat of reaction formed in the catalytic hydrogenation reaction.

It is still a further object of my invention to eliminate costly treating facilities, compressors, and the like, by utilizing once-through hydrogen through my reaction zone.

Therefore, the present invention provides a process for hydrogenating benzene to form cyclohexane which comprises the steps of: (a) admixing a benzene feed with a hydrogen-containing gas and passing the resultant feed mixture through first indirect heat exchange means hereinafter described to a first catalytic hydrogenation reaction zone maintained under hydrogenating conditions sufficient to produce a first reaction zone effluent comprising cyclohexane, hydrogen and light hydrocarbons having from one to six carbon atoms per molecule; (b) passing said first reaction zone effluent to steam generation means wherein at least a portion of the exothermic heat of reaction absorbed by said effluent in said first reaction zone is indirectly heat exchanged with said steam generation means and absorbed by said means; (c) admixing said first reaction zone effluent with a second portion of benzene feed and passing the resultant admixture to a second catalyst hydrogenation reaction zone maintained under hydrogenating conditions sufficient to produce a second reaction zone effluent comprising cyclohexane, hydrogen and light hydrocarbons having from one to six carbon atoms per molecule; (d) passing said second reaction zone effluent to said steam generation means wherein at least a portion of the exothermic heat of reaction absorbed by said effluent in said second reaction zone is indirectly heat exchanged with said steam generation means and absorbed by said means; (e) admixing said second reaction zone effluent with a third portion of benzene feed and passing the resultant admixture to a third catalytic hydrogenation reaction zone maintained under hydrogenating conditions sufficient to produce a third reaction zone effluent comprising cyclohexane, hydrogen and light hydrocarbons having from one to six carbon atoms per molecule: (f) passing said third reaction zone effluent to said first indirect heat exchange means of step (a) wherein at least a portion of the exothermic heat of reaction absorbed by said effluent in said third reaction zone is indirectly heat exchanged with said feed mixture passing to said first reaction zone; (g) withdrawing said third reaction zone effluent from said first heat exchange means and passing said effluent to a separation zone wherein a liquid cyclohexane stream containing a minor amount of hydrogen and light hydrocarbons having from one to six carbon atoms per molecule is substantially separated from a gaseous stream comprising hydrogen and light hydrocarbons having from one to six carbon atoms per molecule; and, (h) passing said cyclohexane stream of step (g) to a stabilizer zone maintained under stabilizing conditions sufficient to produce a high purity cyclohexane product stream substantially free of hydrogen and light hydrocarbons.

As will be described hereinafter in greater detail, the essence of my invention provides for the utilization of once-through hydrogen and the utilization of the exothermic heat of reaction created in the catalytic hydrogenation reaction zones in steam generation means. By the utilization of my invention, the hydrogenation of benzene to cyclohexane is achieved in a more facile and economical manner inasmuch as the typical prior art recycle hydrogen compressor, its attendant piping, the recycle gas treating section as well as various cooling and heating facilities are totally eliminated by my processing system.

My invention can be most clearly described and illustrated with reference to the attached drawing which is a schematic representation of one specific embodiment of my invention.

DESCRIPTION OF THE DRAWING

Referring now to the drawing, a benzene feed in line 1 is admixed in line 3 with a hydrogen-containing gas entering the process via line 2. The resultant feed mixture passes through first indirect heat exchange means 4, hereinafter described, to a first catalytic hydrogenation reaction zone 6, via line 5, maintained under hydrogenating conditions sufficient to produce a first reaction zone effluent comprising cyclohexane, hydrogen and light hydrocarbons having from one to six carbon atoms per molecule. The first reaction zone hydrogenation conditions include a reaction zone inlet temperature in the range of from 250° F. to about 435° F., a pressure in the range of from 200 p.s.i.g. to about 600 p.s.i.g., and a liquid hourly space velocity in the range of from 0.5 to 4.0. The hydrogenation conditions include a reaction zone outlet temperature of at least 600° F., preferably from 600° F. to about 650° F. The hydrogenation conditions include a hydrogenation catalyst which may be any typical hydrogenation catalyst for the hydrogenation of benzene to form cyclohexane. As will be apparent to one skilled in the art, particularly preferred catalysts include composites of nickel, platinum, palladium, iron, Raney nickel, composited with a carrier such as alumina, silica, keiselguhr, and other inorganic oxides alone or in combination. A particularly preferred catalyst for use in my invention comprises platinum composited with alumina.

The first reaction zone effluent is passed from first reaction zone 6 via line 7 to steam generation means 8 wherein at least a portion of the exothermic heat of reaction absorbed by the effluent in the first reaction zone is indirectly heat exchanged with the steam generation means such as the indirect heat exchange means 9. Water is passed to steam generation means 8 via line 8a and steam is removed, via line 8b, from the generation means which utilizes the absorbed heat of reaction from the first reactor.

The first reaction zone effluent leaving steam generator 8 and indirect heat exchange means 9 via line 10 is admixed with a second portion of benzene feed passing via lines 1 and 11 to line 10. The resultant admixture passes via line 12 to second catalytic hydrogenation reaction zone 13 maintained under hydrogenation conditions sufficient to produce a second reaction zone effluent comprising cyclohexane, hydrogen and light hydrocarbons having from one to six carbon atoms per molecule.

The hydrogenating conditions maintained in the second reactor zone 13 includes a reaction zone inlet temperature in the range of from 250° F. to about 435° F., a pressure in the range of from 200 p.s.i.g. to about 600 p.s.i.g., and a liquid hourly space velocity in the range of from 0.5 to 4.0. The hydrogenation conditions include a reaction zone outlet temperature of at least 600° F. As was true with the first reaction zone, the second reaction zone also contains a hydrogenation catalyst which may be similar to the catalyst loaded in the first reactor.

The second reaction zone effluent is passed via line 14 to steam generation means 8 wherein at least a portion of the exothermic heat of reaction absorbed by the effluent in the second reaction zone is indirectly heat exchanged with indirect heat exchange means 15 which absorbs the heat of reaction and generates steam by the passing of water via line 8a into steam generation means 8. The second reaction zone effluent in line 16 is then admixed with a third portion of benzene feed entering the process via lines 1 and 17 and the resultant admixture passes via line 18 to a third catalytic hydrogenation reaction zone 19 under hydrogenation conditions sufficient to produce a third reaction zone effluent comprising cyclohexane, hydrogen and light hydrocarbons having from one to six carbon atoms per molecule.

The hydrogenation conditions in the third reaction zone include a reaction zone inlet temperature in the range of from 250° F. to about 435° F., a pressure in the range of from 200 p.s.i.g. to about 600 p.s.i.g., a liquid hourly space velocity in the range of 0.5 to 4.0. The reaction zone outlet temperature is maintained at a temperature less than 520° F. The third reaction zone also contains a hydrogenation catalyst such as described above with respect to the first and second hydrogenation reaction zones.

The third reaction zone effluent passes from the third reaction zone 19 via line 20 to first indirect heat exchange means 4 that is utilized to heat the feed passing to the first catalytic hydrogenation reaction zone. The exothermic heat of reaction absorbed by the third reaction zone effluent is indirectly heat exchanged with the feed reactor passing to the first reaction zone via lines 3 and 5 described above.

The third reaction zone effluent is withdrawn from first heat exchange means 4 and passed via line 21 to separation zone 22 wherein a liquid cyclohexane stream containing a minor amount of hydrogen and a minor amount of light hydrocarbons having from one to six carbon atoms per molecule is substantially separated from a gaseous stream comprising hydrogen and light hydrocarbons having from one to six carbon atoms per molecule. In the drawing, the gaseous stream is represented as leaving the process via line 23. The liquid cyclohexane stream containing a minor amount of hydrogen and a minor amount of light hydrocarbons is removed from separator 22 via line 24 and passed to a stabilizer zone 25.

As will be apparent to one skilled in the art, separation zone 22 may include refrigeration units, gas and liquid separation means, condensers, and the like.

The cyclohexane stream containing a minor amount of hydrogen and a minor amount of light hydrocarbons having from one to six carbon atoms per molecule is passed into stabilizer zone 25 which is maintained under stabilizing conditions sufficient to produce a high purity product stream substantially free of hydrogen and light hydrocarbons. The stabilizer is normally operated at a pressure in the range of 80 to 90 p.s.i.g. with a top temperature of about 300° F. and a bottom temperature of about 320° F. The stabilizer zone may contain trays, decks, perforated plates and the like and a high purity liquid cyclohexane product substantially free of hydrogen and light hydrocarbons is removed and passed to storage via line 27 while the hydrogen and light hydrocarbons are removed overhead via line 26.

It is also contemplated within the scope of my invention that at least a portion of the cyclohexane-containing stream passing from separation zone 22 via line 24 may be recycled (through lines and means not shown) to line 1 for admixture with the benzene feed passing to the process forming a portion of the feed mixture passing to the first reaction zone. Further, my process is also applicable to a system wherein from 2 to 6 catalytic hydrogenation reaction zones may be utilized.

As will be apparent to one skilled in the art, the hydrogen purity of the hydrogen-containing gas may vary depending upon the source of the hydrogen. As set forth before, when utilizing hydrogen-containing gas from a petroleum hydrocarbon hydrodealkylation process, the off-gas often has less than 70% hydrogen purity. Similarly, extremely high purity hydrogen may be obtained from a source where cryogenic purification means have been utilized so that the hydrogen purity exceeds 99 plus percent. Further, an impure hydrogen stream in the range of 40% to about 60% hydrogen may also be utilized in my invention if only that quality of hydrogen is available in the typical petroleum complex.

It will also be apparent by the discussion above that the exothermic heat of reaction absorbed by the first reaction zone effluent and the exothermic heat of reaction absorbed by the second reaction zone effluent provides the sole source of heat input to the steam generation means. Further, additional intervening cooling and heating of the reactor feeds is eliminated by the efficient use of the exothermic heat of reaction and the various indirect heat exchange means.

PREFERRED EMBODIMENT

In a particularly preferred embodiment of my invention, this invention provides a process for hydrogenating benzene to form cyclohexane which comprises the steps of: (a) admixing a benzene feed with a hydrogen-containing gas and passing the resultant feed mixture having a hydrogen-to-benzene mol ratio in the range of from 5:1 to about 20:1 through first indirect heat exchange means hereinafter described to a first catalytic hydrogenation reaction zone maintained under hydrogenating conditions including a reaction zone inlet temperature in the range of from 300° F. to about 415° F., a reaction zone outlet temperature of at least 600° F. and a pressure in the range of from about 200 p.s.i.g. to 600 p.s.i.g., said conditions sufficient to produce a first reaction zone effluent comprising cyclohexane, hydrogen and light hydrocarbons having from one to six carbon atoms per molecule; (b) passing said first reaction zone effluent to steam generation means wherein at least a portion of the exothermic heat of reaction absorbed by said effluent in said first reaction zone is indirectly heat exchanged with said steam generation means and adsorbed by said means; (c) admixing said first reaction zone effluent with a second portion of benzene feed and passing the resultant admixture to a second catalytic hydrogenation reaction zone maintained under hydrogenating conditions including a reaction zone inlet temperature in the range of from 300° F. to about 415° F., a reaction zone outlet temperature of at least 600° F. and a pressure in the range of from about 200 p.s.i.g. to 600 p.s.i.g., said conditions sufficient to produce a second reaction zone effluent comprising cyclohexane, hydrogen and light hydrocarbons having from one to six carbon atoms per molecule; (d) passing said second reaction zone effluent to said steam generation means wherein at least a portion of the exothermic heat of reaction absorbed by said effluent in said second reaction zone is indirectly heat exchanged with said steam generation means and absorbed by said means; (e) admixing said second reaction zone effluent with a third portion of benzene feed and passing the resultant admixture to a third catalytic hydrogenation reaction zone maintained under hydrogenating conditions including a reaction zone inlet temperature in the range of from 300° F. to about 415° F., a reaction zone outlet temperature of less than 520° F., and a pressure in the range of from about 200 p.s.i.g. to 600 p.s.i.g., said conditions sufficient to produce a third reaction zone effluent comprising cyclohexane, hydrogen and light hydrocarbons having from one to six carbon atoms per molecule; (f) passing said third reaction zone effluent to said first indirect heat exchange means of step (a) wherein at least a portion of the exothermic heat of reaction absorbed by said effluent in said third reaction zone is indirectly heat exchanged with said feed mixture passing to said first reaction zone; (g) withdrawing said third reaction zone effluent from said first heat exchange means and passing said effluent to a separation zone wherein a liquid cyclohexane stream containing a minor amount of hydrogen and light hydrocarbons having from one to six carbon atoms per molecule is substantially separated from a gaseous stream comprising hydrogen and light hydrocarbons having from one to six carbon atoms per molecule; and, (h) passing said cyclohexane stream of step (g) to a stabilizer zone maintained under stabilizing conditions sufficient to produce a high purity cyclohexane product stream substantially free of hydrogen and light hydrocarbons.

As will be shown in detail in the following example, the feed admixture formed by the admixing of the benzene feed with hydrogen-containing gas (via lines 1 and 2) provides the sole source of hydrogen to the first, second and third reaction zones.

Example

Referring now to the drawing, 18.67 mols of benzene is passed via line 1 to admix with a hydrogen-containing gas in line 2 having the following composition, in mols: hydrogen, 393.37; $C_1$, 196.94; $C_2$, 24.87; benzene, 7.10. The hydrogen-containing gas has been caustic and water washed to remove hydrogen sulfide then washed also with benzene to remove toluene and $C_6+$ hydrocarbons. A portion of the cyclohexane-containing stream leaving separation zone 22 via line 24 is recycled (not shown) to admix with the benzene feed so that the total feed mixture passing to the first reaction zone has a composition, in mols, as follows: hydrogen, 394.00; $C_1$, 201.86; $C_2$, 27.37; benzene, 25.77; cyclohexane, 90.00.

It will be apparent that the composition of the recycled separator liquid passing in line 24 to the feed admixing step has a composition, in mols: hydrogen, 0.63; $C_1$, 4.92; $C_2$, 2.50; cyclohexane, 90.00.

The feed admixture enters the first hydrogenation reactor 6 via line 5 which is maintained at an inlet temperature of 400° F. and a pressure of 470 p.s.i.g. The effluent from the first reactor leaves the reactor at a temperature of 615° F. and has the following composition, in mols: hydrogen, 316.69; $C_1$, 201.86; $C_2$, 27.37; cyclohexane, 115.77.

The first reaction zone effluent is passed to steam generation means wherein at least a portion of the exothermic heat of reaction is absorbed by the means. The first reaction zone effluent is admixed with 27.23 mols of benzene feed and passed, at a temperature of 400° F., to the second reaction zone which is maintained at 455 p.s.i.g. The second reaction zone effluent has a composition, in mols, as follows: hydrogen, 235.00; $C_1$, 201.86; $C_2$, 27.37; cyclohexane, 143.00.

The second reaction zone effluent leaves the second reaction zone via line 14 at a temperature of 610° F. and passes to the steam generation means for absorption of at least a portion of the exothermic heat of reaction. Benzene feed via lines 1 and 17 having a composition of 11.63 mols of benzene is admixed with the second reaction zone effluent and passed at 400° F. to the third reaction zone which is maintained at 440 p.s.i.g. The effluent, leaving the third reaction zone via line 20 at a temperature of 490° F., has, in mols, the following composition: hydrogen, 200.11; $C_1$, 201.86; $C_2$, 27.37; cyclohexane, 154.63.

The third reaction zone effluent passes to the first heat exchange means 4 where the exothermic heat of reaction absorbed in the third reaction zone is indirectly heat exchanged with the feed passing to the first reaction zone. The third reaction zone effluent then passes to a separation zone wherein a gas stream, line 23, having the following composition, in mols, is removed from the process: hydrogen, 199.04; $C_1$, 193.41; $C_2$, 23.04; cyclohexane, 1.41.

The cyclohexane-containing stream passing to the stabilizer zone, after recycle to the feed admixture step as discussed hereinabove, has, in mols, the following composition: hydrogen, 0.44; $C_1$, 3.53; $C_2$, 1.83; cyclohexane, 63.22.

The stabilizer is operated so that the net bottoms cyclohexane product has a composition of 63.12 mols of cyclohexane with no hydrogen and no light hydrocarbons present. The net gas leaving the stabilizer zone has a composition, in mols of: hydrogen, 0.44; $C_1$, 3.53; $C_2$, 1.83; cyclohexane, 0.10.

It is thus apparent that there has been no recycle of hydrogen in my process system. Further, a high purity cyclohexane product has been achieved. Further, considerable maintenance and capital expenses have been saved utilizing the method of my invention inasmuch as significantly fewer processing steps have been utilized.

I claim as my invention:

1. A process for hydrogenating benzene to form cyclohexane which comprises the steps of:
   (a) admixing a benzene feed with a hydrogen-containing gas and passing the resultant feed mixture through first indirect heat exchange means hereinafter described to a first catalytic hydrogenation reaction zone maintained under hydrogenating conditions sufficient to produce a first reaction zone effluent comprising cyclohexane, hydrogen and light hydrocarbons having from one to six carbon atoms per molecule;
   (b) passing said first reaction zone effluent to steam generation means wherein at least a portion of the exothermic heat of reaction absorbed by said effluent in said first reaction zone is indirectly heat exchanged with said steam generation means and absorbed by said means;
   (c) admixing said first reaction zone effluent with a second portion of benzene feed and passing the resultant admixture to a second catalytic hydrogenation reaction zone maintained under hydrogenating conditions sufficient to produce a second reaction zone effluent comprising cyclohexane, hydrogen and light hydrocarbons having from one to six carbon atoms per molecule;
   (d) passing said second reaction zone effluent to said steam generation means wherein at least a portion of the exothermic heat of reaction absorbed by said effluent in said second reaction zone is indirectly heat exchanged with said steam generation means and absorbed by said means;
   (e) admixing said second reaction zone effluent with a third portion of benzene feed and passing the resultant admixture to a third catalytic hydrogenation reaction zone maintained under hydrogenating conditions sufficient to produce a third reaction zone effluent comprising cyclohexane, hydrogen and light hydrocarbons having from one to six carbon atoms per molecule;
   (f) passing said third reaction zone effluent to said first indirect heat exchange means of step (a) wherein at least a portion of the exothermic heat of reaction absorbed by said effluent in said third reaction zone is indirectly heat exchanged with said feed mixture passing to said first reaction zone;
   (g) withdrawing said third reaction zone effluent from said first heat exchange means and passing said effluent to a separation zone wherein a liquid cyclohexane stream containing a minor amount of hydrogen and light hydrocarbons having from one to six carbon atoms per molecule is substantially separated from a gaseous stream comprising hydrogen and light hydrocarbons having from one to six carbon atoms per molecule; and,
   (h) passing said cyclohexane stream of step (g) to a stabilizer zone maintained under stabilizing conditions sufficient to produce a high purity cyclohexane product stream substantially free of hydrogen and light hydrocarbons.

2. The process according to claim 1 wherein said hydrogen-containing gas is off-gas from a petroleum hydrocarbon hydrodealkylation operation, said off-gas having a hydrogen purity of less than 70% hydrogen.

3. The process according to claim 1 wherein said hydrogen-containing gas is hydrogen.

4. The process according to claim 1 wherein the exothermic heat of reaction absorbed by said first reaction zone effluent and by said second reaction zone effluent provides the sole source of heat input to said stream generation means.

5. The process according to claim 1 wherein said admixture of step (c) is passed directly to said second reaction zone without additional intervening cooling or heating.

6. The process according to claim 1 wherein said admixture of step (e) is passed directly to said third reaction zone without additional intervening cooling or heating.

7. The process according to claim 1 wherein said feed mixture of step (a) provides the sole source of hydrogen to said first, second and third reaction zones.

8. The process according to claim 1 wherein said hydrogenation conditions in said first, second and third reaction zones include a reaction zone inlet temperature in the range of from 250° F. to about 435° F., a pressure in the range of from about 200 p.s.i.g. to 600 p.s.i.g., and a liquid hourly space velocity in the range of from 0.5 to 4.0.

9. The process according to claim 1 wherein said hydrogenation conditions in said first and second reaction zones include a reaction zone outlet temperature of at least 600° F. and wherein said hydrogenation conditions in said third reaction zone includes a reaction zone outlet temperature of less than 520° F.

10. The process according to claim 1 wherein at least a portion of said cyclohexane-containing stream of step (g) is recycled to admix with said benzene feed of step (a) to form a portion of the resultant feed mixture passing to said first reaction zone.

11. A process for hydrogenating benzene to form cyclohexane which comprises the steps of:
   (a) admixing a benzene feed with a hydrogen-containing gas and passing the resultant feed mixture having a hydrogen-to-benzene mol ratio in the range of from 5:1 to about 20:1 through first indirect heat exchange means hereinafter described to a first catalytic hydrogenation reaction zone maintained under hydrogenating conditions including a reaction zone inlet temperature in the range of from 300° F. to about 415° F., a reaction zone outlet temperature of at least 600° F. and a pressure in the range of from about 200 p.s.i.g. to 600 p.s.i.g., said conditions sufficient to produce a first reaction zone effluent comprising cyclohexane, hydrogen and light hydrocarbons having from one to six carbon atoms per molecule;
   (b) passing said first reaction zone effluent to steam generation means wherein at least a portion of the exothermic heat of reaction absorbed by said effluent in said first reaction zone is indirectly heat exchanged with said steam generation means and absorbed by said means;
   (c) admixing said first reaction zone effluent with a second portion of benzene feed and passing the resultant admixture to a second catalytic hydrogenation reaction zone maintained under hydrogenating conditions including a reaction zone inlet temperature in the range of from 300° F. to about 415° F., a reaction zone outlet temperature of at least 600° F. and a pressure in the range of from about 200 p.s.i.g. to 600 p.s.i.g., said conditions sufficient to produce a second reaction zone effluent comprising cyclohexane, hydrogen and light hydrocarbons having from one to six carbon atoms per molecule;
   (d) passing said second reaction zone effluent to said steam generation means wherein at least a portion of the exothermic heat of reaction absorbed by said effluent in said second reaction zone is indirectly heat exchanged with said steam generation means and absorbed by said means;
   (e) admixing said second reaction zone effluent with a third portion of benzene feed and passing the resultant admixture to a third catalytic hydrogenation reaction zone maintained under hydrogenating conditions including a reaction zone inlet temperature in the range of from 300° F. to about 415° F., a reaction zone outlet temperature of less than 520° F. and a pressure in the range of from about 200 p.s.i.g. to 600 p.s.i.g., said conditions sufficient to produce a third reaction zone effluent comprising cyclohexane, hydrogen and light hydrocarbons having from one to six carbon atoms per molecule;

(f) passing said third reaction zone effluent to said first indirect heat exchange means of step (a) wherein at least a portion of the exothermic heat of reaction absorbed by said effluent in said third reaction zone is indirectly heat exchanged with said feed mixture passing to said first reacton zone;

(g) withdrawing said third reaction zone effluent from said first heat exchange means and passing said effluent to a separation zone wherein a liquid cyclohexane stream containing a minor amount of hydrogen and light hydrocarbons having from one to six carbon atoms per molecule is substantially separated from a gaseous stream comprising hydrogen and light hydrocarbons having from one to six carbon atoms per molecule; and (h) passing said cyclohexane stream of step (g) to a stabilizer zone maintained under stabilizing conditions sufficient to produce a high purty cyclohexane product stream substantally free of hydrogen and light hydrocarbons.

12. The process according to claim 11 wherein at least a portion of said cyclohexane-containing stream of step (g) is recycled to admix with said benzene feed of step (a) to form a portion of the resultant feed mixture passing to said first reaction zone.

References Cited

UNITED STATES PATENTS

| | | | |
|---|---|---|---|
| 3,253,048 | 5/1966 | Cabbage | 260—667 |
| 3,426,088 | 2/1969 | Proctor | 260—667 |
| 3,428,696 | 2/1969 | Hallman | 260—667 |
| 3,428,697 | 2/1969 | Zulueta | 260—667 |
| 3,450,784 | 6/1969 | Reilly et al. | 260—667 |
| 3,450,785 | 6/1969 | Carson | 260—667 |
| 2,934,573 | 4/1960 | Paulsen et al. | 260—667 |
| 2,755,317 | 7/1956 | Kassel | 260—667 |

DELBERT E. GANTZ, Primary Examiner

V. O'KEEFE, Assistant Examiner